No. 716,857. Patented Dec. 30, 1902.
L. BOIVIN.
DECOUPLING ATTACHMENT.
(Application filed Apr. 12, 1902.)
(No Model.)
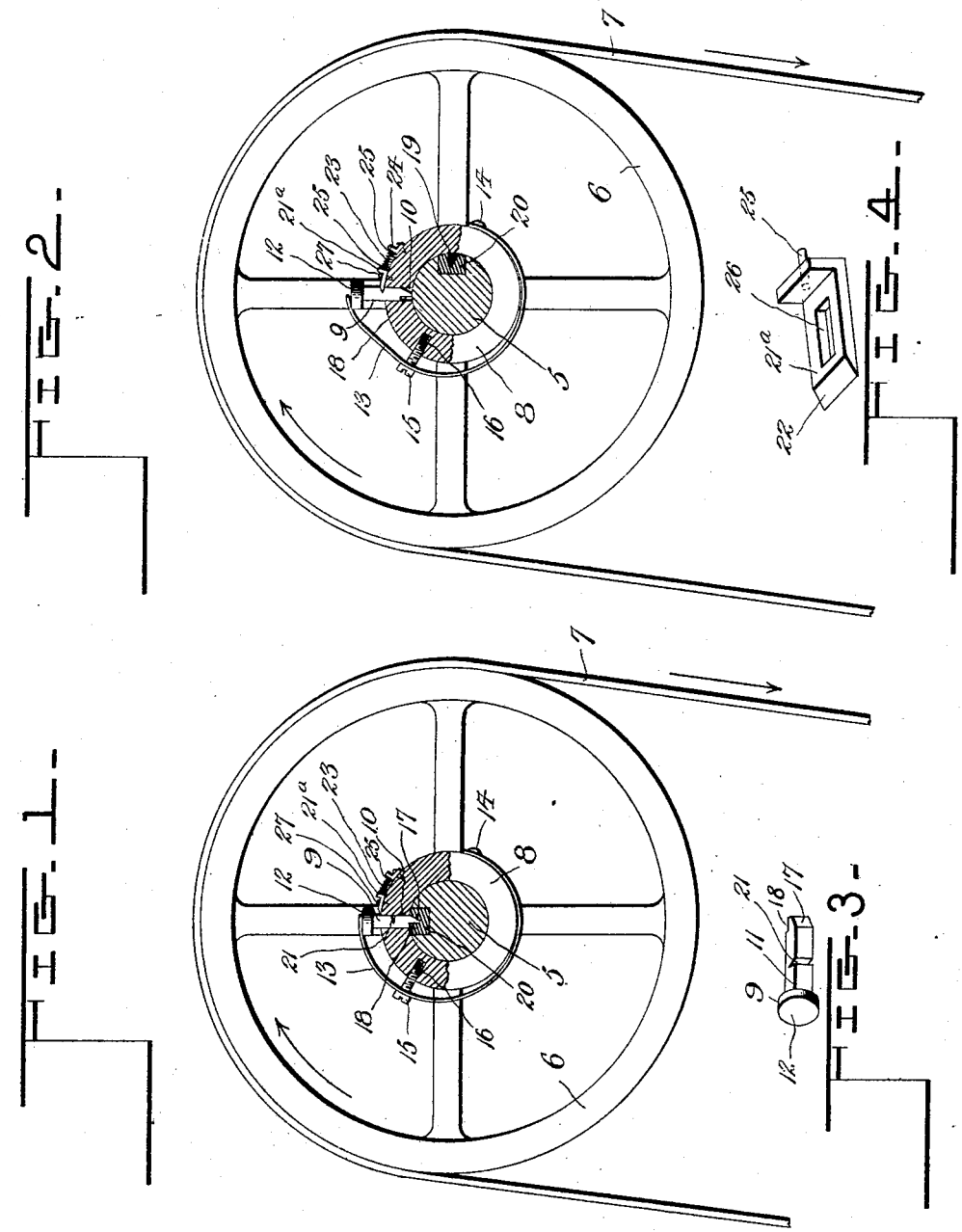
Witnesses:
Ted Page
George W. Colles
Louis Boivin Inventor,
By Marion & Marion
Attorneys
THE NORRIS PETERS CO., PHOTO-LITHO., WASHINGTON, D. C.

UNITED STATES PATENT OFFICE.

LOUIS BOIVIN, OF ST. SAUVEUR OF QUEBEC, CANADA.

DECOUPLING ATTACHMENT.

SPECIFICATION forming part of Letters Patent No. 716,857, dated December 30, 1902.

Application filed April 12, 1902. Serial No. 102,612. (No model.)

*To all whom it may concern:*

Be it known that I, LOUIS BOIVIN, a subject of the King of Great Britain, residing at St. Sauveur of Quebec, Province of Quebec, Canada, have invented certain new and useful Improvements in Decoupling Attachments; and I do hereby declare that the following is a full, clear, and exact description of the invention, such as will enable others skilled in the art to which it appertains to make and use the same.

My invention relates to a device intended for preventing accidents to machinery to which power is applied by permitting the same to be suddenly stopped automatically in case any obstacle catches in the machinery which tends to obstruct the operation of the same; and it is the object of this invention to prevent breakage either of the machinery or of the object which may be caught therein due to the continued application of the power by automatically disconnecting the power from the main shaft operating the machine.

My invention is intended particularly for application to shoe-sewing machinery, although it may equally well be applied to any kind of machinery which is apt to be stopped or broken by foreign obstacles catching therein, especially in the case of gearing between which objects may be thrown and cause the gears to be stripped.

To these ends my invention consists, essentially, in a pin or bolt of peculiar shape connecting the main shaft of the machine with the part adapted to drive it—such, for instance, as the hub of a pulley driven by a power-belt—and this pin is formed to project into a seat in the circumference of the shaft and has a driving-surface so arranged that an excessive reaction of the shaft, caused by an overload or accident, will cause said pin to become suddenly disengaged therefrom, after which the pin will be so caught that it cannot be reëngaged.

Another feature of my invention which I preferably though not necessarily apply consists in the formation of the rear face of the pin, which is differently formed from the driving-face, so as to catch positively in the shaft at all times and allow the same to be turned backwardly at any time, so that the machine may be readily disengaged from the obstacle caught therein no matter what power may be required to do so.

Another feature of my invention consists in the means of adjustment I have provided for the inwardly-directed tension on the head of the pin which holds the latter in driving connection with the shaft, this tension being very nicely adjustable by my arrangement, so as to provide for the exact force which is necessary to disengage the shaft from the pin.

My invention further consists in the improved construction and combination of parts hereinafter to be described, and more particularly pointed out in the claims.

I have illustrated one form of my invention in the accompanying drawings, wherein—

Figure 1 is a side elevation, partly in section, of a driving-pulley mounted on a main shaft and connected thereto by the attachment constituting my invention. Fig. 2 is a similar view to Fig. 1, but showing the shaft automatically disconnected therefrom. Fig. 3 is a detail perspective view of the connecting-pin, and Fig. 4 is a similar view of the latch.

The same numerals of reference denote like parts in all the figures of the drawings.

The main shaft of the machine is represented by the numeral 5, and on it is mounted a driving-pulley 6, which is driven by a main belt 7 in the direction indicated by the arrow. The driving-pulley 6 has a hub-sleeve 8, which turns easily on the shaft 5, and the sleeve, as shown, is operatively connected to the shaft by the pin 9, which constitutes the most essential part of my invention. This pin is arranged to reciprocate in a radial aperture 10 in the hub-sleeve 8, this aperture being preferably square to correspond with the form of the shank 11 of the pin, as shown in Fig. 3, thus preventing the pin from turning in its socket, although of course any other means, such as a sliding feather, might be equally well employed, as will be well understood. The pin 9 is provided at its outer end with a head 12, on which presses the free end of an arcuate plate-spring 13, which, as herein shown, partially surrounds the hub-sleeve 8 and is secured thereto at its other end by a screw 14, while at an intermediate point it is engaged by the head of a set-screw 15, mounted in the threaded socket 16, and by this screw the tension on the head of the bolt or pin 9 may be very nicely adjusted.

The lower end of the connecting-pin 9 is of peculiar shape, as indicated in Figs. 1 and 2, its forward or driving face (shown on the right) being beveled or chamfered at an angle slightly greater than a right angle, with the tangent to the shaft, as shown at 17, so that the reaction of the shaft 5 against the face 17 of the pin will cause a slight resultant radial pressure against the pin in addition to the main pressure, which is tangential. The precise angle of the beveled face 17 depends on the amount of power which is required to be transmitted to the shaft, the friction of the two surfaces, and the tension of the spring 13, the last of which elements can, as hereinbefore mentioned, be nicely regulated by the set-screw 15. The rear face 18 of the pin 17 is formed with a vertical jog or notch, so that in turning the pulley 6 backwardly there is no reaction of the shaft tending to thrust the pin outwardly. The end of the pin thus formed fits into a correspondingly-formed recess or socket 19 in the side of the shaft, and this is preferably provided with a block 20, of hardened steel, which forms a lining-face for the connecting-pin and prevents the sides of the socket 19 from becoming bruised or worn.

The shank of the pin 9 is furthermore provided in one side thereof at an intermediate point with a notch 21, which is so located that it shall be precisely opposite the outer face of the hub-sleeve 8 when the end of the pin rests upon the face of the shaft, as shown in Fig. 2, and coacting with this notch I provide a latch-piece 21$^a$, which is provided with a beveled end 22, adapted to extend into the notch, and is yieldably pressed against the side of the pin by the spring 23, which abuts against a bracket 24, fixed on the side of the hub-sleeve. Both the bracket 24 and the latch 21$^a$ are provided with pins 25, which project through the coil of the spring 23 and hold the same in its place, while the latch 21$^a$ is provided, as shown, with a slot 26, through which projects a screw 27, so as to permit the latch to slide longitudinally and to be guided by said screw.

In the operation of the machine the tension of the spring 13 will be so regulated as to keep the pin 9 in driving connection with the shaft 5 under all ordinary circumstances and to supply sufficient power thereto to perform the customary operations; but in case any excessive power comes upon the shaft, such as might be caused by an accident or by overstraining the machine, the reaction of the shaft 5 will be so great as to throw the pin 9 out of connection with the socket 19, as shown in Fig. 2, and the pulley 6 will now rotate loosely upon the shaft, being no longer keyed thereto. Meanwhile as soon as the pin 9 is thrown out of the socket 19 the latch 21$^a$ will be caused to drop into the notch 21, so that the pin 9 is prevented from returning into the socket 19 when the pulley has made a complete revolution and comes opposite the socket again. The pulley will therefore continue turning loosely on the shaft without engaging therewith until the obstacle has been removed and it is desired to reëngage the pulley with the shaft, which may be done readily by withdrawing the latch 21$^a$ from the notch 21 and turning the pulley until the pin 9 drops into the socket 19 again.

In case the obstacle becomes caught in the machine and it is necessary to turn it backwardly in order to extract it, this may be done by reëngaging the pin 9 with the socket 19, as beforesaid, and drawing backwardly on the pulley 6, the belt 7 having been previously disconnected. The vertical face 18 of the pin will now enable the shaft 5 to be turned backwardly without danger of the pin 9 being thrown out.

While I have above described my invention in a particular form, it will be understood, of course, that many other forms might be substituted, and especially I desire to say that it is not by any means necessary that the two connected parts should be in the form of a shaft and a surrounding sleeve, but they might be in the form of two abutting shafts, one of which carries the pin, or of many other forms, such as will readily occur to a skilled mechanic, and are embraced in the scope of the following claims.

Having thus described my invention, what I claim as new, and desire to secure by Letters Patent, is—

1. A decoupling device comprising a driving part, a driven part adjacent thereto, a pin slidably mounted in one of said parts and having an oblique driving-face adapted to project into an oblique socket in the opposite part, means yieldably pressing said pin into operative relation, and a latch adapted to secure and hold said pin when it is pressed out of operative relation.

2. A decoupling device comprising a driving part, a driven part adjacent thereto, a pin slidably mounted in one of said parts and having an oblique driving-face adapted to project into an oblique socket in the opposite part, means yieldably pressing said pin into operative relation, and a spring-pressed latch adapted to catch and hold said pin when it is thrust out of operative relation.

3. A decoupling device comprising a shaft having a socket, a sleeve surrounding the same, a pin radially slidable in said sleeve, having an end beveled on one side and radial on the other and adapted to project into the socket in said shaft, and a spring yieldably pressing upon the head of said pin.

4. A decoupling device comprising a shaft having a socket, a sleeve surrounding the same, a pin radially slidable in said sleeve and having a beveled end adapted to project into the socket in said shaft, a spring yieldably pressing upon the head of said pin, means for adjusting the tension of said spring, and a latch adapted to catch and hold said pin in retracted position.

5. A decoupling device comprising a shaft having a socket, a sleeve mounted to turn loosely thereon, a connecting-pin mounted to slide in said sleeve and having a beveled face adapted to fit in the socket in said shaft, a spring fixed to said sleeve and adapted to press upon the head of said pin, and a set-screw mounted to press upon said spring at an intermediate point.

6. A decoupling device comprising a shaft having a socket, a sleeve mounted to turn loosely thereon, a connecting-pin mounted to slide in said sleeve and having a beveled face adapted to fit in the socket in said shaft, a spring fixed to said sleeve and adapted to press upon the head of said pin, a set-screw mounted to press upon said spring at an intermediate point, and a spring-pressed latch adapted to project into a suitable notch in said pin and hold it in retracted position.

7. A decoupling device comprising a shaft having a recess in the side thereof, a socketed block of hardened metal mounted in said recess, the socket thereof having an oblique face, a sleeve loosely mounted on said shaft, a pin mounted to slide vertically therein and having an oblique end adapted to fit in said socket, and means yieldably pressing said pin into connection with the shaft.

8. A decoupling attachment comprising a shaft having a socket, a sleeve mounted to turn thereon, a pin mounted to reciprocate radially in said sleeve and having an inwardly-projecting end with an oblique forward face and a rear radial face adapted to be engaged with corresponding faces formed in the socket in said shaft, a spring pressing upon the head of the pin, and means for adjusting the tension of the spring.

9. A decoupling attachment comprising a shaft having a socket, a sleeve mounted to turn thereon, a pin mounted to reciprocate radially in said sleeve and having an inwardly-projecting end with an oblique forward face and a rear radial face adapted to be engaged with corresponding faces formed in the socket in said shaft, a spring pressing upon the head of the pin, means for adjusting the tension of the spring, and a latch spring-pressed against the side of said pin and adapted to hold the same in retracted position.

10. A decoupling attachment comprising a shaft having a socket, a sleeve mounted to turn thereon, a pin mounted to reciprocate radially in said sleeve and having an inwardly-projecting end with an oblique forward face and a rear radial face adapted to be engaged with corresponding faces formed in the socket in said shaft, a spring pressing upon the head of the pin, means for adjusting the tension of the spring, a latch spring-pressed against the side of the said pin and adapted to hold the same in retracted position, and a hardened block set in a recess in the shaft in which the socket for the pin is formed, substantially as described.

In witness whereof I have hereunto set my hand in the presence of two witnesses.

LOUIS BOIVIN.

Witnesses:
FÉLIX BEAULÉ,
ARTHUR MENARD.